Dec. 15, 1953  A. R. SQUYER ET AL  2,662,779
WHEELED SUPPORT FOR HEADLIGHT TESTER
Filed Aug. 15, 1950  2 Sheets-Sheet 1
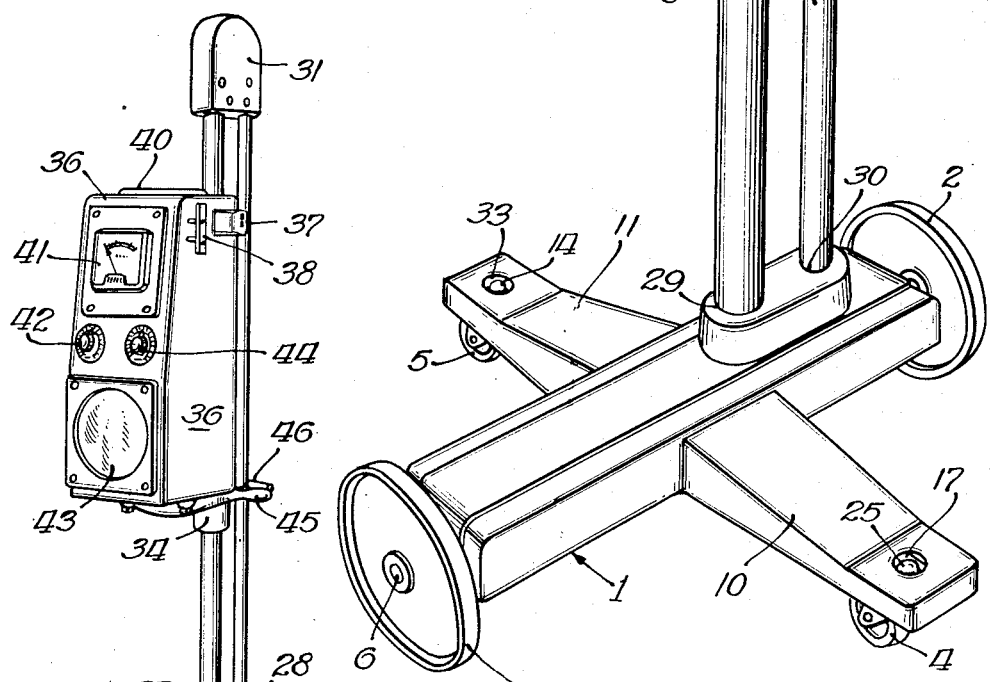
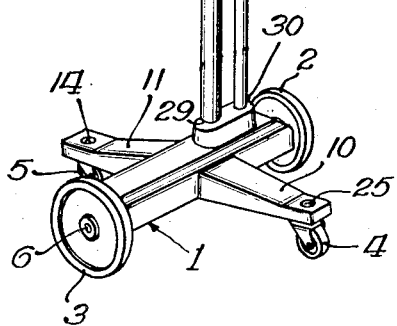
INVENTORS:
Albert R. Squyer
Paul F. Dirksen
By: Brown, Jackson, Boettcher & Dienner
Attys.

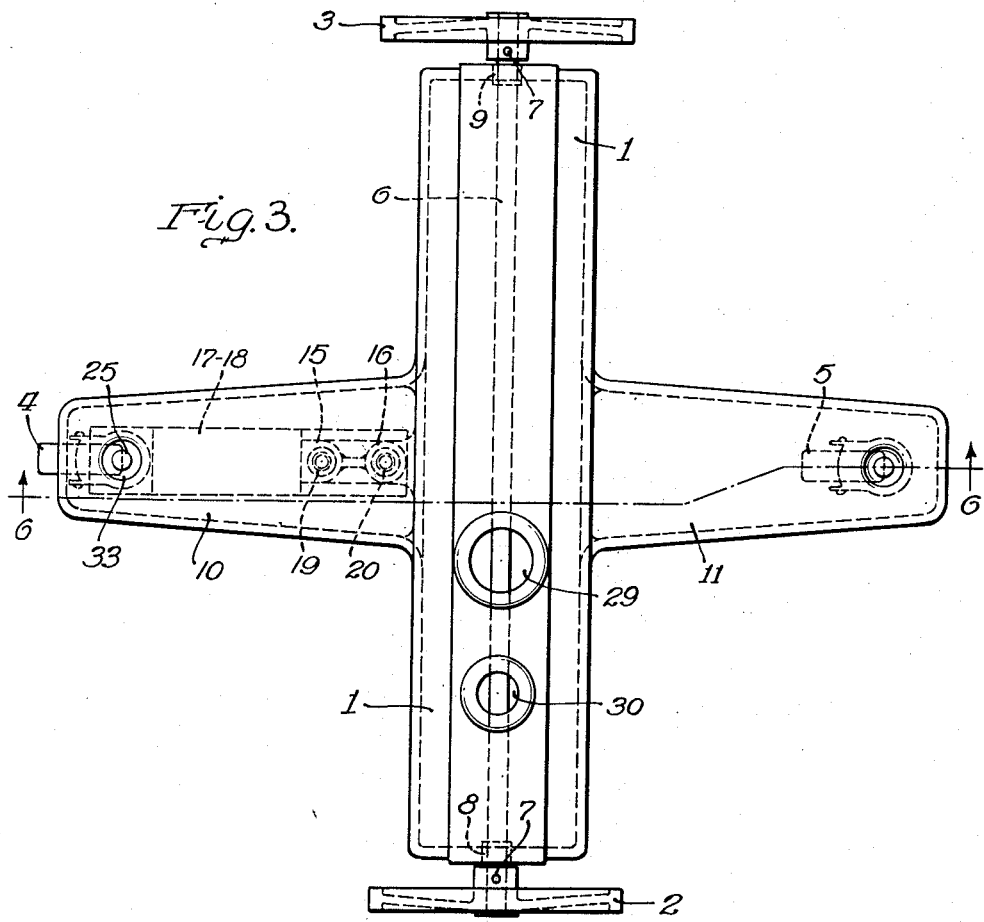
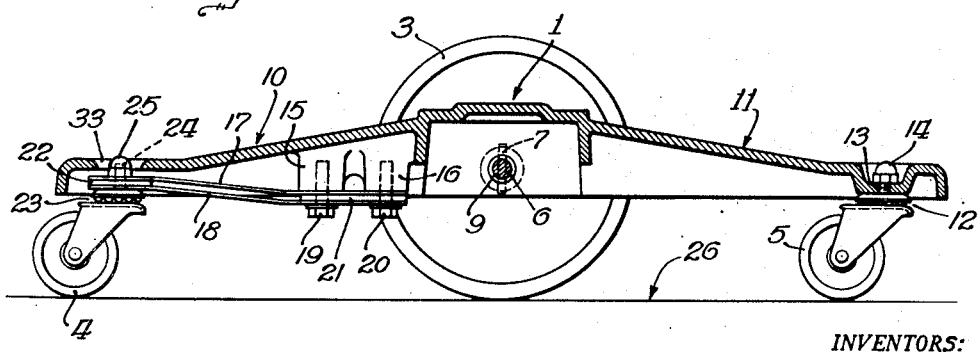

Patented Dec. 15, 1953

2,662,779

UNITED STATES PATENT OFFICE 2,662,779

WHEELED SUPPORT FOR HEADLIGHT TESTER

Albert R. Squyer and Paul F. Dirksen, Springfield, Ill., assignors to Weaver Manufacturing Company, Springfield, Ill., a corporation of Illinois Application August 15, 1950, Serial No. 179,578

5 Claims. (Cl. 280—79)

This invention relates to devices for testing the headlights of motor vehicles to determine whether they are functioning properly and whether their beams are correctly aimed. The invention has particular relation to certain novel features of betterment in headlight testers which concern an improved base or support for the test head.

Headlight testers for finding whether or not the beams from a pair of headlamps are aimed forwardly in the desired direction or deviate laterally from such position, and for determining the brightness of the light rays or beams emanating from the headlights are known in the art.

According to one well known practice, it is customary to align the test head with the longitudinal axis of the vehicle. For the purpose of obtaining such alignment the test head is usually equipped with sights similar to gun sights which are mounted in a vertical plane parallel to the optical axis of the test head. The head may be swivelled to the right or left to align the sights with the longitudinal axis of the vehicle, generally using the radiator ornament and center windshield rib, or other visible parts which are parallel or in line with such longitudinal axis.

After the desired alignment with the longitudinal axis of the vehicle is obtained the tester is moved laterally until it is directly in front of the headlight to be tested. Where the other headlight is to be tested, it is thereafter necessary to move the tester laterally until it is directly in front of said other headlight.

In order to assure lateral movement of the tester in a straight path at right angles to the longitudinal axis of the vehicle to maintain the desired alignment of the test head in its different laterally spaced positions, it has heretofore been customary to guide the tester upon tracks mounted on the floor or other surface of the garage or other place where the headlights are tested. Where such tracks are required they must be mounted on the floor or other surface and the tester is limited in use to the place where the tracks are located.

One of the main objects of the present invention is to provide an improved headlight tester which will operate effectively on floors or other surfaces which are reasonably smooth and flat without requiring a track or other guide means for guiding the tester laterally to its different laterally spaced positions. The tester is thus portable and may be used in various locations in the garage or other place where the headlights are to be tested, thereby enhancing its usefulness.

Another and more specific object of the invention is to provide the headlight tester with a novel and improved base or support which will move in a straight line on reasonably smooth or flat surfaces for the purpose of accomplishing the results set forth.

Other objects and advantages, and numerous adaptations of the invention will be apparent from the following detailed description and accompanying drawings.

In the drawings:

Figure 1 is a perspective three quarter front view of the complete tester, including the base and its supporting wheels and casters adapted to roll on the floor or other supporting surface;

Figure 2 is a perspective view of the base of the tester and a portion of the upright posts of the device, including the supporting wheels and casters which adapt the device to roll along the floor;

Figure 3 is a top plan view of the base and supporting wheels; and

Figure 4 is a vertical cross section of the base and associated parts comprising the base assembly taken on the line 4—4 of Figure 3.

Referring to the drawings, the embodiment of the invention therein illustrated comprises a cross shaped base member 1 equipped with carrying wheels 2 and 3, and casters 4 and 5. The wheels 2 and 3 are of the same diameter and are rigidly secured one on each end of a shaft 6, for example, by drive pins 7, which extend diametrically through integral hubs on wheels 2 and 3 and through the shaft 6. It is to be understood that the wheels 2 and 3 may be keyed to the shaft 6 or secured by set screws or in any other suitable or preferred manner. Thus, the wheels 2 and 3 must rotate together. There can be no relative rotation between them. The rims of the wheels 2 and 3 are preferably relatively hard. It follows then, that if the wheels 2 and 3 are rolled on a reasonably flat and smooth surface, they will inherently roll in a straight path unless one or the other of these wheels is forcibly caused to slip on the surface.

The shaft 6 is mounted to rotate in the bushings 8 and 9 which are mounted in alignment one in each end of the base 1. The base 1 has side arms 10 and 11 formed integrally therewith and one caster 5 is mounted on the side arm 11 at its outer end. This caster 5 freely swivels at 12 on its vertical threaded stem 13 which is rigidly secured to the base side arm 11 by a nut 14 screwed on stem 13.

Near the inner end and on the under-side of the opposite side arm 10 are two bosses 15 and 16. Two flat normally straight spaced apart leaf springs 17 and 18 are secured in a horizontal position to the under surfaces of the bosses 15 and 16 by cap screws 19 and 20 which pass through aligned or matching holes in the spring leaves and are screwed into studded or tapped holes in the bosses 15 and 16. The two leaf springs 17 and 18 are maintained at their inner ends in spaced apart relation by a flat spacer block 21 secured between them by screws 19 and 20, the upper and lower side of the spacer 21 being parallel. At the outer end of the pair of springs 17 and 18 and mounted between them is a flat spacer block 22 of the same thickness as the spacer block 21.

The caster 4 which is preferably though not restrictedly of the same physical dimensions and type as the caster 5, freely swivels at 23 on its vertical threaded stem 24, which is rigidly secured to the outer end of the parallel spring leaves 17 and 18 by means of a nut 25 screwed on stem 24. The stem 24 extends through matching holes in springs 17 and 18 and in the spacer 22. The spacer 22 is firmly clamped between springs 17 and 18 by the tightening of the nut 25 on the stem 24.

The wheels 2 and 3, together with the chosen type of the casters 4 and 5, and the relative location of the faces of bosses 15 and 16 to which springs 17 and 18 are secured, are so arranged that when the wheels 2 and 3 and the casters 4 and 5 rest upon a flat floor or other surface 26, the springs 17 and 18 are flexed upwardly somewhat from their normal straight position. This upwardly flexed position is shown in Figure 4. The force required to flex the pair of springs this amount is so chosen by the design of the springs that it is considerably less than the total weight of the complete device including the base assembly, the uprights 27 and 28 which are secured to the base in the holes 29 and 30, the top terminal member 31 and the test head designated in its entirety at 36.

The vertical stems 13 and 24 of the casters 5 and 4 respectively are preferably, although not restrictedly, equidistant from the center line of the shaft 6 mounting the wheels 2 and 3 on the base 1. Since the base 1 is rockable on the shaft 6, the downward pressure of the caster 4 on the floor or other surface due to the flexing of the pair of springs 17 and 18 will cause the base member and associated uprights 27 and 28 and all of their associated parts to rock on the shaft 6 until the caster 5 contacts the floor. The downward pressure exerted by the caster 4 keeps the caster 5 in contact with the floor, and base 1 in a normally horizontal position, and the uprights 27 and 28 in a normally vertical position due to the height of the caster 5 being such as to attain this condition. It follows further, that since the casters 4 and 5 are substantially equidistant from the shaft 6 their respective pressures on the floor are substantially equal. The present invention is not however, necessarily restricted in this detail. It is evident that the sum of the moments of casters 4 and 5 about shaft 6 is a constant, whose amount is directly proportional to the force exerted by the caster 4 due to the deflection of the springs 17 and 18 from their normal flat load position.

In general, the designed loading of the springs is such that the casters 4 and 5 will support ⅕ to ¼ of the total weight of the device, the remainder of such weight being carried by the wheels 2 and 3. The normal tendency of these wheels to roll in a straight line on a smooth flat floor has been previously explained.

Since a caster can inherently roll in any direction due to the ability of the wheel to swivel about the vertical stem, the wheels of the casters 4 and 5 simply trail, and have no steering ability and do not control the direction in which the device rolls. Since the wheels 2 and 3 support a major portion of the weight of the device and the casters 4 and 5 support a minor portion of this weight and also in themselves have no directional or steering ability, the device as a whole will roll in a straight line on a smooth flat floor.

The use of two spaced apart parallel spring leaves arranged as illustrated and described, causes the vertical stem of the caster 4 to maintain its vertical position. While this attribute is desirable, it is not absolutely essential to the efficient operation of a caster especially as regards its ability to swivel. The device will function satisfactorily with the caster mounted on a single leaf spring. Also a coil spring might be used around the stem of the caster and the stem constrained to slide up and down in a vertical guide hole in the side arm of the base, thus pre-loading the caster a specified amount without departing from the spirit of the present invention.

An essential feature of the present invention is the limiting of the load supported by the two casters, thereby causing the two wheels 2 and 3 to carry the major portion of the total weight of the device. There are other well known non-directional rolling support devices than casters, such as ball casters, so called, or ball transfers. Any presently known device of this character may be used in lieu of the swivel casters illustrated without departing from the spirit of the present invention. The nut 25 moves freely in an opening 33 in the side arm 10.

Referring to Figures 1 and 2, it will be noted that the two upright posts 27 and 28 extend vertically upward from the base 1. A cross-head 34 is mounted for vertical sliding movement on the posts 27 and 28 and is properly counterbalanced and adapted to swivel in a horizontal plane about the post 27. Rigidly mounted on the cross-head is a test head 36 which comprises instrumentalities for the testing of lights. Mounted as shown for example in Figure 1, on one side near the top of the test head 36 are two sights 37 and 38. These are similar to gun sights but are used for lateral sighting only.

The test head 36 may be, for example, in general, of the type shown and described in G. M. Graham et al., Patent No. 2,167,803, patented August 1, 1939; or of the type shown and described in R. N. Falge, Patent No. 2,176,215 patented October 17, 1939, or of the type shown and described in C. W. MacMillan Patent No. 2,215,224 patented September 17, 1940; or of the type shown and described in A. R. Squyer Patent No. 2,291,114, patented July 28, 1942; or of any other suitable form.

Suffice it for purposes of the present application to state that the test head 36 has a beam pattern viewing window 40 in the top thereof. A candle power meter is provided at 41 and a dial 42 calibrated in inches in 25 feet shows the side aim of the light beam. A convex lense 43 directs the beam pattern, for example, on to photoelectric cell means (not shown) within the test head 36. A dial 44 calibrated in inches in 25 feet, shows the vertical aim of the light beam. A handle 45 may be employed for raising and lowering the counter-balanced test head 36 and adjusting screw or knob 46 is provided for aligning the tester with the car.

In operation, the tester is positioned in front of, close to and facing the vehicle whose headlights are to be tested, as shown in Figure 2. The tester is rolled sideways until the sights 37 and 38 are approximately in line with the center line of the hood of the vehicle. The operator looks through the rear sight 37 and over the front sight 38 and adjusts the knob 35 thus swivelling the test head right or left until the sights 37 and 38 are in ine with the hood center line or with the front radiator ornament and windshield center rib. This accomplished, the tester is then rolled sidewise until it is in front of one headlight. The readings for that headlight are then taken whereupon the tester is rolled to the other headlight and the readings for that headlight are taken. Due to the rolling characteristics of the base or support 1 as previously described, the lateral alignment of the sights, and consequently the test head is maintained.

The rolling characteristics of the base or support 1 make it possible to use the headlight tester in various places in the garage or service station rather than having a fixed location in which it must be used as is necessary with a tester which operates on a track.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

We claim:

1. In a device of the character described, in combination, a movable supporting base elongated transversely of the direction of movement thereof, a shaft extending along the transverse direction of said base and mounted to turn in aligned bearings on said base for rocking movement of said base about the axis of said shaft, a pair of main supporting wheels on said shaft beyond opposite ends of said base, said main supporting wheels being of equal diameter and having relatively hard rims for rolling engagement with a flat horizontal surface, said main supporting wheels being constrained to rotate as a unit and to eliminate relative movement between them, a pair of arms integral with said base and extending at substantially right angles from opposite sides of said base from position substantially midway between said main supporting wheels, a first swiveling non-directional wheel carried on the outer end of one of said arms, leaf spring means secured to said base and extending outwardly along said other arm, a second swiveling non-directional wheel carried on the outer end of said leaf spring means, and upright load supporting means carried by said base at position in closer proximity to the axis of said shaft than to said swiveling non-directional wheels for supporting a load above said base, said leaf spring means being flexed upwardly when said main supporting wheels and said swiveling non-directional wheels rest upon said surface and the tension of said spring arm being so chosen that with the ability of said base to rock about said shaft the main weight of the load on said upright load supporting means is placed on said main supporting wheels whereby to cause said base inherently to roll in a straight path.

2. A device according to claim 1 wherein the leaf spring means secured to the base and carrying the second swiveling non-directional wheel comprises a pair of leaf springs with spacers therebetween at the place of securement to said base and at the place where said second swiveling non-directional wheel is carried by said leaf spring means.

3. A device according to claim 1 wherein the upright load supporting means is positioned in closer proximity to one of said main supporting wheels than to the other supporting wheel, and a load carried by said upright load supporting means in position elevated above said base and overhanging said base in the direction of said other load supporting wheel.

4. In a device of the character described, in combination, a movable supporting base, a shaft mounted in aligned bearings on said base for rotation in said bearings and for rocking movement of said base about the axis of said shaft, a pair of main load carrying wheels of equal diameter on said shaft beyond opposite ends of said base, said main load carrying wheels having relatively hard rims for rolling engagement with a flat horizontal surface and constrained to rotate as a unit and to eliminate relative movement between them, an upright load support extending upwardly from said base in position between said main load carrying wheels and in substantial vertical alignment with the axis of said shaft so that the center of gravity of the entire load is substantially over the axis of said shaft, a rigid arm integral with said base and extending from one side of said base between said main load carrying wheels and in a direction at substantially right angles to said base, a first swiveling non-directional rolling wheel swiveled on a substantially vertical axis in said arm in position spaced outwardly at substantially right angles from one side of said shaft, at least one spring arm attached at its inner end to said base and extending from the opposite side of said base in a direction at substantially right angles to said shaft and in alignment with said rigid arm, and a second swiveling non-directional rolling wheel swiveled on a substantially vertical axis in said spring arm in position spaced outwardly at substantially right angles from the opposite side of said shaft, said spring arm being flexed upwardly when said main load carrying wheels and said swiveling non-directional rolling wheels rest upon said surface and the tension of said spring arm being so chosen that with the ability of said base to rock about said shaft the main weight of the load on said load support is placed on said main load carrying wheels whereby to cause said base inherently to roll in a straight path.

5. A device according to claim 4 wherein there is a second rigid arm integral with said base and extending from the opposite side of said base in a direction at substantially right angles to said shaft and in alignment with said first rigid arm, said second rigid arm overlying said spring arm and having an opening at the upper end of said substantially vertical axis of said second swiveling non-directional rolling wheel.

ALBERT R. SQUYER.
PAUL F. DIRKSEN.

References Cited in the file of this patent

UNITED STATES PATENTS

| Number | Name | Date |
|---|---|---|
| 115,097 | Plantz | May 23, 1871 |
| 682,662 | Bartholomew | Sept. 17, 1901 |
| 769,625 | Parks et al. | Sept. 6, 1904 |
| 897,853 | Scheidt | Sept. 1, 1908 |
| 1,209,408 | Dorsey | Dec. 19, 1916 |
| 1,378,445 | Ferris | May 17, 1921 |
| 1,738,096 | Cole | Dec. 3, 1929 |
| 1,923,304 | Friedli et al. | Aug. 22, 1933 |
| 2,161,886 | Weaver | June 13, 1939 |
| 2,176,214 | Falge et al. | Oct. 17, 1939 |